United States Patent
Kono et al.

(10) Patent No.: US 7,134,421 B2
(45) Date of Patent: Nov. 14, 2006

(54) DIRECT FUEL INJECTION SPARK IGNITION INTERNAL COMBUSTION ENGINE

(75) Inventors: Toshiya Kono, Yokohama (JP); Hitoshi Ishii, Kanagawa (JP); Mitsuhiro Akagi, Yokohama (JP); Katsuaki Uchiyama, Yokohama (JP)

(73) Assignee: Nissna Motor Co., Ltd., Yokohama (JP)

( * ) Notice: Subject to any disclaimer, the term of this patent is extended or adjusted under 35 U.S.C. 154(b) by 0 days.

(21) Appl. No.: 11/189,128

(22) Filed: Jul. 26, 2005

(65) Prior Publication Data

US 2006/0016419 A1    Jan. 26, 2006

(30) Foreign Application Priority Data

Jul. 26, 2004  (JP) ............................. 2004-216747
Aug. 3, 2004   (JP) ............................. 2004-226236

(51) Int. Cl.
*F02B 5/00*   (2006.01)
*F02B 1/02*   (2006.01)

(52) U.S. Cl. ................................. 123/305; 123/406.47

(58) Field of Classification Search ................ 123/295, 123/300, 305, 299, 406.47, 406.44, 406.53, 123/406.55
See application file for complete search history.

(56) References Cited

U.S. PATENT DOCUMENTS

| | | | | |
|---|---|---|---|---|
| 5,865,153 | A * | 2/1999 | Matsumoto | ................. 123/299 |
| 6,112,716 | A * | 9/2000 | Tachibana | ................... 123/305 |
| 6,158,409 | A | 12/2000 | Gillespie et al. | |
| 6,684,630 | B1 * | 2/2004 | Uchida et al. | ................. 60/284 |
| 6,725,649 | B1 * | 4/2004 | Yamashita et al. | ............ 60/284 |
| 6,751,948 | B1 | 6/2004 | Takemura et al. | |
| 6,772,585 | B1 * | 8/2004 | Iihoshi et al. | ................. 60/277 |
| 6,880,518 | B1 * | 4/2005 | Shiraishi et al. | ............ 123/295 |
| 6,895,933 | B1 * | 5/2005 | Miwa et al. | ........... 123/406.47 |
| 2003/0217733 | A1 * | 11/2003 | Shiraishi et al. | ............ 123/295 |

FOREIGN PATENT DOCUMENTS

| | | |
|---|---|---|
| EP | 1 559 889 A2 | 8/2005 |
| EP | 1 559 896 A2 | 8/2005 |
| GB | 1 201 932 | 8/1970 |
| JP | 2001-336467 A | 12/2001 |
| JP | 2003-113717 A | 4/2003 |
| JP | 2004-036461 A | 2/2004 |
| WO | WO 01/25618 A1 | 4/2001 |

OTHER PUBLICATIONS

U.S. Appl. No. 11/038,645, filed Jan. 21, 2005, Tomita.
U.S. Appl. No. 11/038,643, filed Jan. 21, 2005, Ishii et al.

* cited by examiner

*Primary Examiner*—Mahmoud Gimie
(74) *Attorney, Agent, or Firm*—Foley & Lardner LLP

(57) ABSTRACT

When, with a piston assuming the top dead center (TDC) on the compression stroke, a fuel is injected from a nozzle of a fuel injection valve, the injected fuel from the nozzle is guided to reach electrodes of a spark plug by a concave surface defined by a crown portion of a piston. A control unit is provided that controls the fuel injection valve and the spark plug. The control unit is configured to carry out under a given condition controlling the fuel injection valve to start the fuel injection at a time before the top dead center (TDC) on the compression stroke and finish the fuel injection at a time after the top dead center (TDC) on the compression stroke; and controlling the spark plug to carry out the ignition at a time after the top dead center (TDC).

14 Claims, 10 Drawing Sheets

DIRECT FUEL INJECTION SPARK IGNITION INTERNAL COMBUSTION ENGINE

BACKGROUND OF THE INVENTION

1. Field of the Invention

The present invention relates in general to direct fuel injection spark ignition internal combustion engines, and more particularly to the engines of a type that has a control system for controlling a fuel injection timing and an ignition timing in accordance with an operation condition of the engine.

2. Description of the Related Art

In order to clarify the task of the invention, two known engines of the above-mentioned type which have been hitherto proposed or put into practical use will be briefly described, which as are shown in Japanese Laid-open Patent Applications (Tokkai) 2001-336467 and 2003-113717.

The former describes one measure in which when a catalytic converter in an exhaust system of the internal combustion engine is not sufficiently heated, the fuel injection is carried out on the compression stroke and at the same time the ignition timing is retarded with respect to a top dead center (TDC) on the compression stroke.

The latter describes the other measure in which, during the compression stroke, a fuel injected from each fuel injector is reflected by a top of the piston to be directed toward the electrodes of the spark plug. Actually, the crown portion of the piston is so shaped as to promote such fuel reflection.

As is known in the art, in order to accelerate or promote the activation of the catalytic converter after cold starting of the engine, it is preferable to increase the temperature of the exhaust gas, and in order to reduce HC (hydrocarbons) in the exhaust gas, it is preferable to largely retard the ignition timing. However, if the ignition timing is too retarded, a combustion stability of the engine is deteriorated and thus retarding of the ignition timing has inevitably a limitation. Thus, it is difficult to obtain a stable combustion especially when the engine is not sufficiently warmed up. Actually, the limited ignition timing determined based on the stable combustion is at a relatively advanced side and thus, usually, sufficient retarding of the ignition timing is not practically made.

In the measure disclosed by the publication 2003-113717, the crown portion of the piston is formed with a recess of which bottom surface constitutes a parabolically concave surface. The concave surface is so shaped as to have a focus at electrodes of a spark plug at the time when a fuel is injected from a fuel injection valve. However, in the period before the fuel injection on the compression stroke, the moving speed of the piston is quite high and thus practically, the period for which the focus of the concave bottom surface of the recess of the piston is kept placed at the electrodes of the spark plug is very short. Thus, the combustion stability of the engine is affected severely by the fuel injection period.

It is therefore an object of the present invention to provide a direct fuel injection spark ignition internal combustion engine, which is free of the above-mentioned drawbacks.

As will become apparent from the following description, in accordance with the present invention, the following measures are practically employed to solve the above-mentioned drawbacks.

That is, when the engine is in a predetermined operation condition, such as a condition just after cold starting, the control is so made that the fuel injection starts at a time before the top dead center (TDC) on the compression stroke and ends at a time after the top dead center (TDC) on the compression stroke, and the ignition of the injected fuel is carried out at a time after the top dead center (TDC) on the compression stroke. Furthermore, the crown portion of the piston is so shaped that when the piston comes to the top dead center (TDC) on the compression stroke, a fuel injected from the fuel injector can be reflected by the crown portion to be directed toward electrodes of a spark plug.

In accordance with a first aspect of the present invention, there is provided a direct fuel injection spark ignition internal combustion engine which comprises a cylinder; at least one intake port leading to the cylinder; at least one exhaust port extending from the cylinder; a piston axially movably received in the cylinder to define in the same a combustion chamber that is connectable with the intake and exhaust ports through intake and exhaust valves respectively; a fuel injection valve having a fuel injection nozzle exposed to the combustion chamber; a spark plug having electrodes exposed to the combustion chamber; an arrangement wherein when, with the piston assuming the top dead center on the compression stroke, a fuel is injected from the nozzle of the fuel injection valve, the injected fuel from the nozzle is guided to reach the electrodes of spark plug by a crown portion of the piston; and a control unit that controls the fuel injection valve and the spark plug, the control unit being configured to carry out under a given condition controlling the fuel injection valve to start the fuel injection at a time before the top dead center (TDC) on the compression stroke and finish the fuel injection at a time after the top dead center (TDC) on the compression stroke; and controlling the spark plug to carry out the ignition at a time after the top dead center (TDC).

In accordance with a second aspect of the present invention, there is provided a direct fuel injection spark ignition internal combustion engine, which comprises an arrangement wherein when, with a piston assuming the top dead center (TDC) on the compression stroke, a fuel is injected from a nozzle of a fuel injection valve, the injected fuel from the nozzle is guided to reach electrodes of a spark plug by a concave surface defined by a crown portion of a piston; and a control unit that controls the fuel injection valve and the spark plug, the control unit being configured to carry out under a given condition controlling the fuel injection valve to start the fuel injection at a time before the top dead center (TDC) on the compression stroke and finish the fuel injection at a time after the top dead center (TDC) on the compression stroke; and controlling the spark plug to carry out the ignition at a time after the top dead center (TDC).

In accordance with a third aspect of the present invention, there is provided a method of operating a direct fuel injection spark ignition internal combustion engine which comprises a cylinder; at least one intake port leading to the cylinder; at least one exhaust port extending from the cylinder; a piston axially movably received in the cylinder to define in the same a combustion chamber that is connectable with the intake and exhaust ports through intake and exhaust valves respectively; a fuel injection valve having a fuel injection nozzle exposed to the combustion chamber; a spark plug having electrodes exposed to the combustion chamber; and an arrangement wherein when, with the piston assuming the top dead center (TDC) on the compression stroke, a fuel is injected from the nozzle of the fuel injection valve, the injected fuel from the nozzle is guided to reach the electrodes of spark plug by a crown portion of the piston. The method comprises controlling the fuel injection valve to start the fuel injection at a time before the top dead center (TDC)

on the compression stroke and finish the fuel injection at a time after the top dead center (TDC) on the compression stroke; and controlling the spark plug to carry out the ignition at a time after the top dead center (TDC).

DETAILED DESCRIPTION OF THE INVENTION

In the following, the present invention will be described in detail with reference to the accompanying drawings.

For ease of understanding, various directional terms such as right, left, upper, lower, rightward and the like are used in the following description. However, such terms are to be understood with respect to only a drawing or drawings on which corresponding portion or part is shown.

Figure 5:
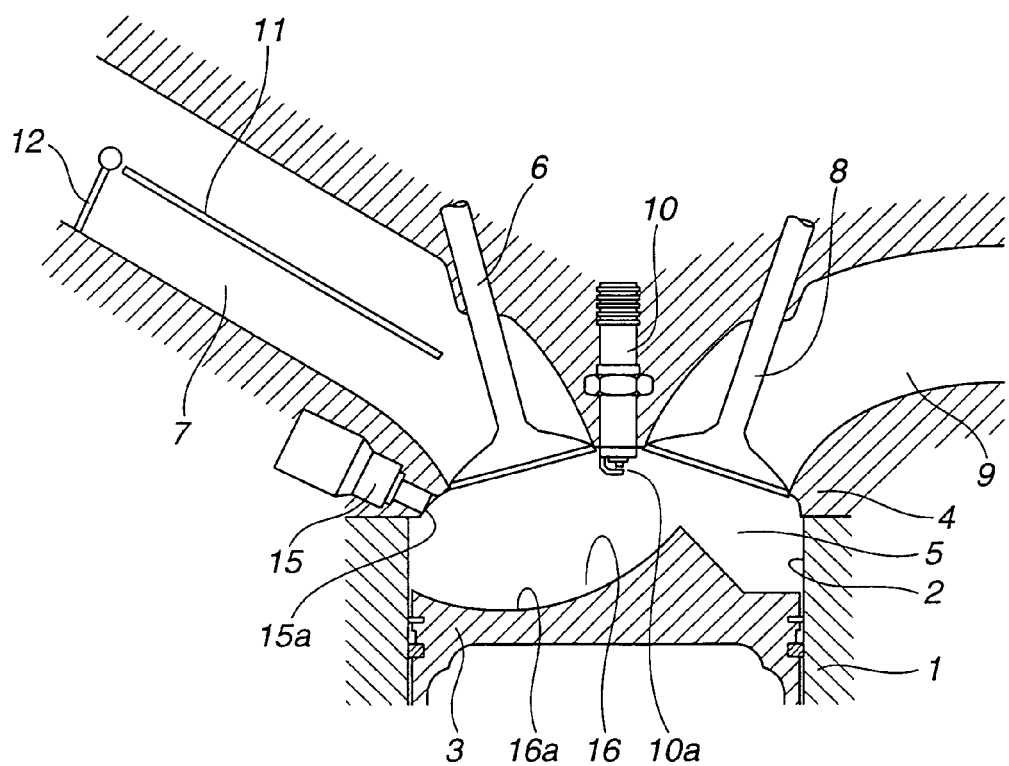
FIG. 5 is a sectional view of an essential portion of a direct fuel injection spark ignition internal combustion engine of the present invention.
Figure 6:
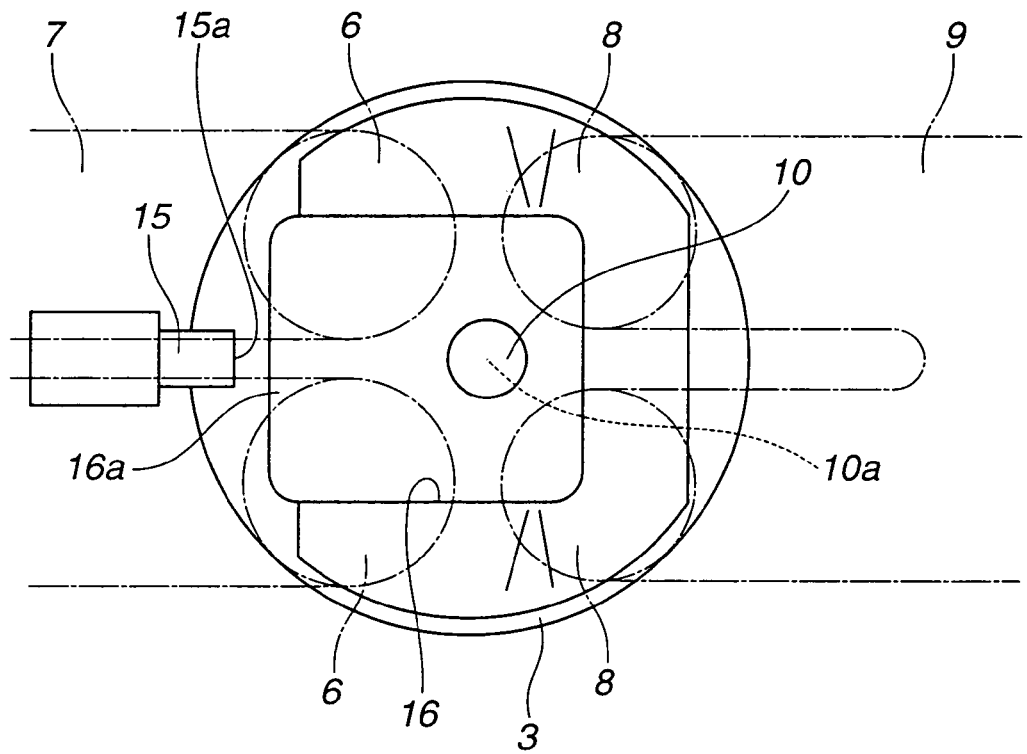
FIG. 6 is a plan view of the direct fuel injection spark ignition internal combustion engine of the present invention.
Figure 7:
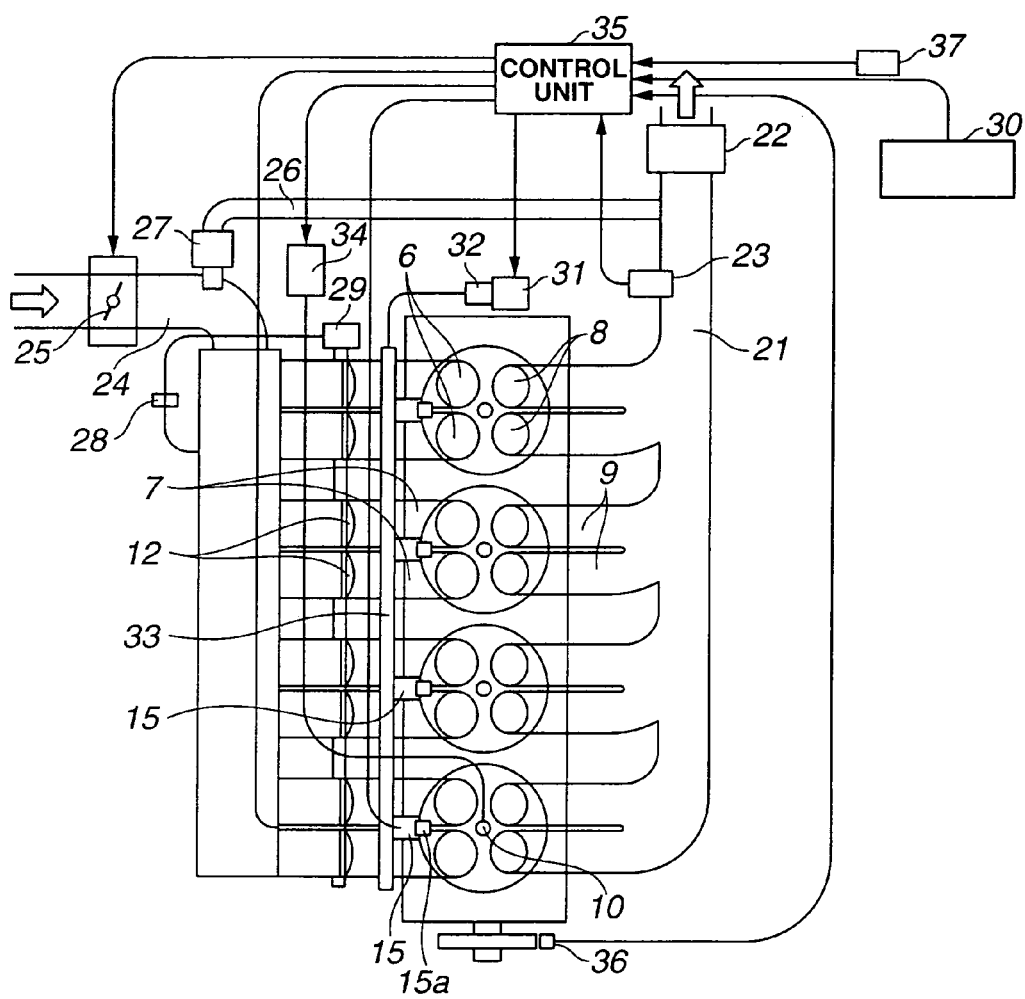
FIG. 7 is a schematic view of an entire construction of the engine of the present invention.

Referring to FIGS. 5 to 7, there is shown a direct fuel injection spark ignition internal combustion engine according to the present invention.

FIGS. 5 and 6 show one cylinder 2 and various parts associated with cylinder 2, and FIG. 7 shows an entire construction of the engine of the present invention. As is seen from FIG. 7, the engine is of an in-line four cylinder type.

As is seen from FIGS. 5 and 6, particularly FIG. 5, within cylinder 2 formed in a cylinder block 1, there is slidably received a piston 3 that has a crown portion (no numeral). A combustion chamber 5 is thus defined in cylinder 2 between a cylinder head 4 and the crown portion of piston 3. In the illustrated embodiment, combustion chamber 5 is of a pent-roof type.

Cylinder head 4 is mounted and secured to cylinder block 1 and has two intake ports 7 and two exhaust ports 9 formed therein.

As is seen from FIGS. 6 and 7, intake ports 7 are equipped with respective intake valves 6 and exhaust ports 9 are equipped with respective exhaust valves 8. These four valves 6 and 8 are opened and closed in a known manner under operation of the engine.

That is, in the illustrated embodiment of the invention, two intake valves 6 and two exhaust valves 8 are provided for each cylinder 2.

As is understood from FIG. 5, at a center portion of a ceiling of combustion chamber 5, there is provided a spark plug 10 that has electrodes 10*a* projected into combustion chamber 5, as shown.

As shown, in the illustrated embodiment, a partition wall 11 extends in and along each intake port 7 to divide the port 7 into upper and lower intake port passages for enhancing a tumble flow of intake air in a certain operation condition of the engine. An upstream end of the lower intake port passage is equipped with a tumble control valve 12 that is operated to open and close the passage.

As is known in the art, when the lower intake port passage is closed by tumble control valve 12, the tumble flow of intake air is enhanced and when the passage is opened, the tumble flow is weakened.

If desired, tumble control valve 12 may be removed, or in place of tumble control valve 12, a known swirl control valve may be used.

Below two intake ports 7 of cylinder head 4, more specifically, at a position below a center position between the two intake ports 7, there is arranged a fuel injection valve 15 that has a fuel injection nozzle 15*a* exposed to combustion chamber 5.

As shown in FIG. 5, fuel injection valve 15 is arranged at one side of combustion chamber 5 near intake valves 6. As is seen from this drawing, fuel injection valve 15 is postured to inject from nozzle 15*a* thereof a fuel obliquely downward into combustion chamber 5.

Furthermore, as is seen from FIG. 6, fuel injection valve 15 is arranged to inject from nozzle 15*a* thereof the fuel in a direction perpendicular to a piston pin (not shown) held by piston 3.

Referring back to FIG. 5, the crown portion of piston 3 has a projected area that projects toward the ceiling of the pent-roof type combustion chamber 5, and as is seen from FIG. 6, a rectangular recess 16 is formed in the crown portion of piston 3.

As is understood from FIG. 5, a bottom surface 16*a* of rectangular recess 16 forms a rounded concave surface with a larger radius of curvature.

That is, as is seen from this drawing, when the crown portion of piston 3 is sectioned by an imaginary plane that includes an after-mentioned imaginary center axis "F" (see FIG. 8) defined by a fuel spray injected from nozzle 15*a* of fuel injection valve 15 and extends perpendicular to the piston pin held by piston 3, bottom surface 16*a* of rectangular recess 16 shows a gently curved line. While, when the crown portion of piston 3 is sectioned by another imaginary plane that extends in parallel with the piston pin, bottom surface 16*a* shows a laterally extending straight line at a relatively deep portion.

Furthermore, as is seen from FIG. 6, rectangular recess 16 has a left straight edge that faces at right angles to nozzle 15*a* of fuel injection valve 15 and a right rectangular portion that is positioned below electrodes 10*a* of spark plug 10.

Figure 8:
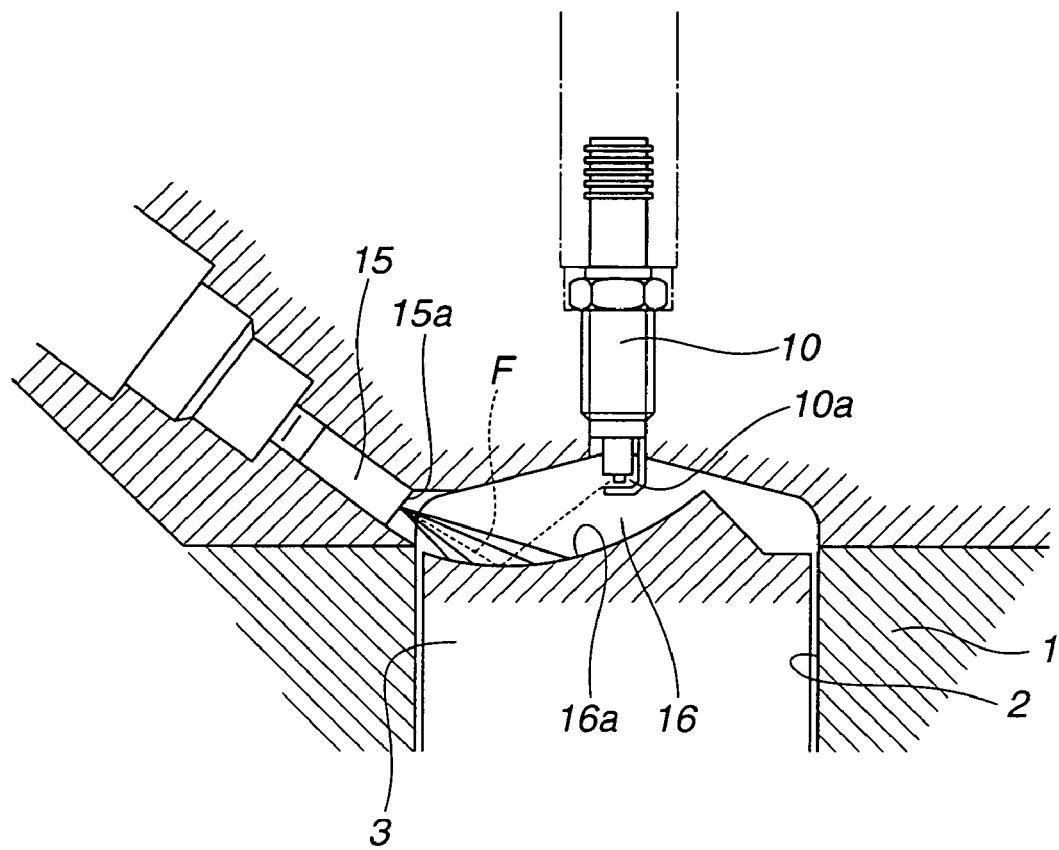
FIG. 8 is an illustration depicting a positional relationship between a piston, a spark plug and a fuel injection valve at the time when a piston comes to the top dead center (TDC) on the compression stoke.

As is seen from FIG. 8, in the present invention, when, with piston 3 taking the top dead center (TDC) on the compression stroke, a fuel spray injected from nozzle 15a of fuel injection valve 15 is directed toward bottom surface 16a of rectangular recess 16 and reflected by the same, an imaginary center axis "F" defined by the injected and reflected fuel spray is directed toward electrodes 10a of spark plug 10.

That is, in the present invention, in addition to the positional relationship between fuel injection valve 15, spark plug 10 and piston 3 at the top dead center (TDC), the shape and posture of these elements 15, 10 and 3 are optimally took into consideration.

As is seen from FIG. 7, the engine to which the present invention is practically applied is of an in-line four cylinder type.

Eight exhaust ports 9 from the four cylinders are merged and connected to an exhaust passage 21.

At a downstream part of exhaust passage 21, there is mounted a catalytic converter 22 for purifying the exhaust gas, and at a part of exhaust passage 21 between catalytic converter 22 and the exhaust port 9 closest to the converter 22, there is arranged an air-fuel ratio sensor (viz., oxygen sensor) 23.

Eight intake ports 7 from the four cylinders are merged and connected to an intake passage 24.

At an upstream part of intake passage 24, there is arranged an electronically controlled throttle valve 25 of which opening degree is controlled by an instruction signal fed thereto.

Between the above-mentioned exhaust passage 21 and intake passage 24, there extends an exhaust gas recirculation passage (EGR passage) 26 that has an EGR valve 27 near intake passage 24, as shown.

Tumble control valves 12, that are eight in total, are synchronously opened or closed by a vacuum type actuator 29 into which a negative pressure is led from intake passage 24 through a solenoid valve 28.

To fuel injection valves 15 that are four in total, there is fed a pressure-regulated fuel from a fuel pump 31 through a pressure regulator 32 and a fuel gallery 33. Thus, upon receiving an instruction signal (pulse signal), each fuel injection valve 15 is opened to inject from nozzle 15a thereof a given quantity of fuel into combustion chamber 5. The quantity of the injected fuel corresponds to the period for which the valve 15 is kept opened.

Spark plugs 10, that are four in total, are connected to an ignition coil 34.

For controlling the fuel injection timing, the fuel injection quantity, the ignition timing, etc., a control unit 35 is employed, that is a microcomputer comprising CPU (central processing unit), RAM (random access memory), ROM (read only memory) and input and output interfaces.

As shown in FIG. 7, information signals are fed to control unit 35 from an acceleration degree sensor 30, a crank angle sensor 36, the above-mentioned air-fuel ratio sensor 23, a cooling water temperature sensor 37, etc. These sensors 30, 36, 23 and 37 sense a depression degree of an accelerator pedal, a crank angle of the engine, an air-fuel ratio and a temperature of engine cooling water, respectively.

In the following, operation of the engine of the invention will be described with reference to the drawings, particularly FIGS. 7 and 8.

For ease of understanding, the description will be commenced with respect to a condition that is established when warm-up of the engine has been completed, that is, for example, when the engine cooling water has shown a temperature higher than 80° C.

In this case, a stratified combustion operation and a homogenous combustion operation are carried out by the engine.

That is, in a predetermined low speed low load operation range, a normal stratified combustion operation mode is selected. More specifically, in such range, tumble control valves 12 are closed and at a suitable time of the compression stroke, a fuel injection is carried out and at a time just before the top dead center (TDC) on the compression stroke, ignition of the injected fuel is carried out. In this operation mode, the fuel injection is finished before the top dead center (TDC) on the compression stroke.

As is seen from FIG. 8, in the given period of the compression stroke, a given quantity of fuel is injected from nozzle 15a of fuel injection valve 15 toward rectangular recess 16 of piston 3. The fuel thus injected is guided toward spark plug 10 by the action of tumble flow of intake air around recess 16 to produce a stratified air-fuel mixture and then ignited by spark plug 10. With this, a stratified combustion operation with a leaner air-fuel ratio is carried out.

While, in a predetermined high speed high load operation range, a normal homogeneous combustion operation mode is selected. That is, in such range, tumble control valves are kept opened and at a suitable time of the intake stroke, a fuel injection is carried out and at a time "MBT" (minimum advance for best torque) just before the top dead center (TDC) on the compression stroke, ignition of the injected fuel is carried out. In this operation mode, the fuel thus injected is forced to produce a homogenous air-fuel mixture in cylinder 2, and thus the engine is operated generally on a stoichiometric air-fuel ratio.

While, when the engine cooling water still shows a temperature lower than 80° C., that is, when the warm-up of the engine has not been completed yet, a so-called TDC injection operation mode is selected for promoting the temperature increase (or activation) of catalytic converter 22 and reducing the quantity of HC (hydrocarbons) in the exhaust gas.

In this TDC injection operation mode, as is seen from FIG. 1, a fuel injection is controlled to start at a time "ITS" (which will be referred to "injection start timing" hereinafter) just before the top dead center (TDC) on the compression stroke and end at a time "ITE" (which will be referred to "ignition end timing" hereinafter) just after the top dead center (TDC) on the compression stroke. That is, the fuel injection is continued passing through the top dead center (TDC) on the compression stroke.

In the TDC injection operation mode, ignition of the injected fuel is carried out at a time "ADV" after the top dead center (TDC) on the compression stroke. More specifically, the ignition is carried out at the time "ADV" that is retarded from the injection start timing "ITS" by approximately 15° to approximately 20° in crank angle.

During this retarded period "D", the fuel spray is reflected by bottom surface 16a of recess 16 of piston 3 and brought to electrodes 10a of spark plug 10 to produce an air-fuel mixture mass around electrodes 10a of spark plug 10. Thus, the mixture mass can be assuredly ignited and burnt, which brings about the stratified combustion of the mixture. In this combustion mode, the averaged air-fuel ratio is controlled to a stoichiometric value.

Figure 1:
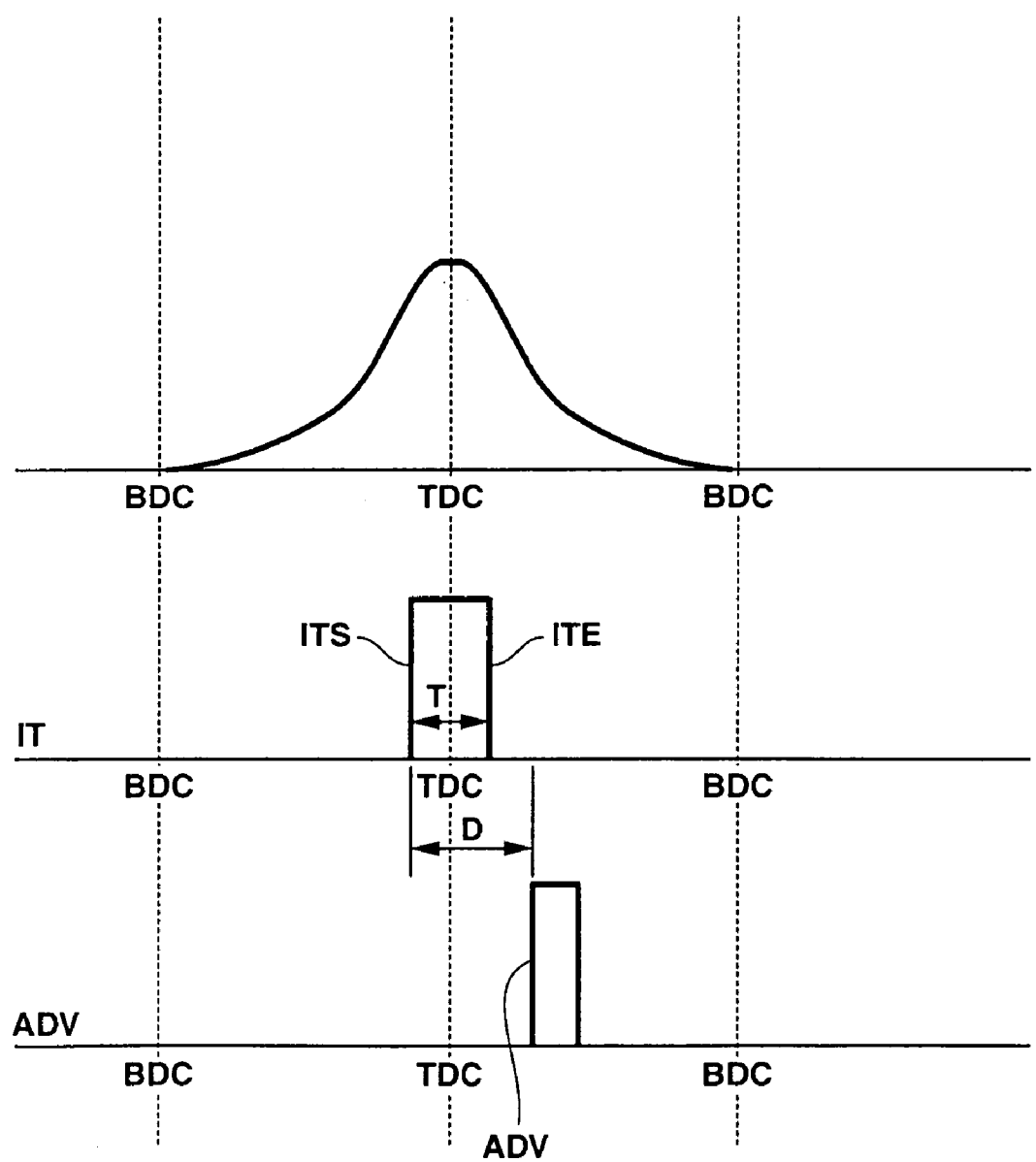
FIG. 1 is a characteristic graph showing fuel injection start and end timings and an ignition timing, which are practically employed in the engine in accordance with the present invention.

In FIG. 1, denoted by reference "BDC" is the bottom dead center of piston 3.

In accordance with the present invention, the injection start timing "ITS" is set at a predetermined crank angle of the engine, and the ignition end timing "ITE" is set in accordance with the injection start timing "ITS" and the quantity of injected fuel (or fuel injection period). Of course, the two timings "ITS" and "ITE" may be so determined as to have an equal period from the top dead center (TDC) with respect to the injected fuel quantity.

FIG. 8 shows a condition of the engine wherein piston 3 takes the top dead center (TDC) on the compression stroke.

As is seen from this drawing and FIG. 1, in this condition, fuel is kept injected into combustion chamber 5. In this condition, piston 3 takes the highest position in cylinder 2, and a positional relation is so made that that nozzle 15a of fuel injection valve 15 is directed toward bottom surface 16a of recess 16 of piston 3 in an inclined direction. Thus, the fuel spray from the injection nozzle 15a is forced to impinge obliquely on bottom surface 16a of recess 16 and reflected by the same toward electrodes 10a of spark plug 10.

Figure 9:
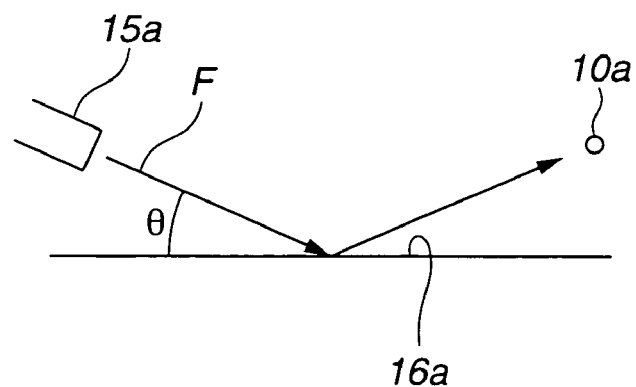
FIG. 9 is an illustration showing an angle at which an injected fuel is directed to a bottom surface of a recess formed in a crown portion of the piston.

It is to be noted that as is seen from FIGS. 8 and 9, the above-mentioned imaginary center line "F" is defined by the conically expanding fuel spray injected from nozzle 15a of injection valve 15. As shown in these drawings, the fuel traveling along the imaginary center axis "F" is directed toward electrodes 10a of spark plug 10 after being reflected on bottom surface 16a.

As is seen from FIG. 9, in the present invention, the imaginary center axis "F" defines an inclination against the bottom surface 16a by an angle "θ" that is preferably from approximately 10° to approximately 50°.

It is to be noted that when the conically expanding fuel spray is viewed on the plan view of FIG. 6, the spray would be illustrated by a sectoral form that has an arcuate front edge thereof directed toward electrodes 10a.

As is described hereinabove, in the present invention, the fuel injection is continuously carried out from the time "ITS" just before the top dead center (TDC) on the compression stroke to the time "ITE" just after the top dead center (TDC) passing through the top dead center (TDC).

Thus, in the fuel injection period, piston 3 makes only a small movement. This means that during the fuel injection, the positional relation between nozzle 15a of fuel injection valve 15, bottom surface 16a of recess 16 of piston 3 and electrodes 10a of spark plug 10 is substantially unchanged, and thus, the fuel spray reflecting manner is kept substantially unchanged during the fuel injection period.

Thus, by such fuel injection and reflection, a desired air-fuel mixture mass can be assuredly produced around electrodes 10a of spark plug 10.

When the injection start timing "ITS" and the injection end timing "ITE" are set to have an equal period from the top dead center (TDC) on the compression stroke as has been mentioned hereinabove, the position change of piston 3 during the fuel injection period is minimum, which promotes formation of the desired air-fuel mixture mass around electrodes 10a of spark plug 10.

If desired, in the TDC injection operation mode, by controlling pressure regulator 32, the pressure of fuel injected from nozzle 15a of each fuel injection valve 15 may be set higher than that set in the normal stratified or homogenous combustion operation mode. When using this measure, a rush force of the fuel spray from nozzle 15a of the valve 15 is increased and thus much assured reflection of the fuel spray on bottom surface 16a of recess 16 is expected and thus, undesired fuel adhesion on bottom surface 16a is effectively reduced. Furthermore, by such measure, the fuel injection period can be reduced and thus the movement of piston 3 during the fuel injection period can be much reduced.

As is described hereinabove, in the present invention, when the engine is not sufficiently warmed up, the so-called TDC injection operation mode is practically carried out. With this mode, a desired air-fuel mixture mass can be produced around electrodes 10a of spark plug 10 with the aid of the unique shape of the crown portion of piston 3.

The above-mentioned advantageous features of the present invention will become much clarified from the following description.

Figure 2:
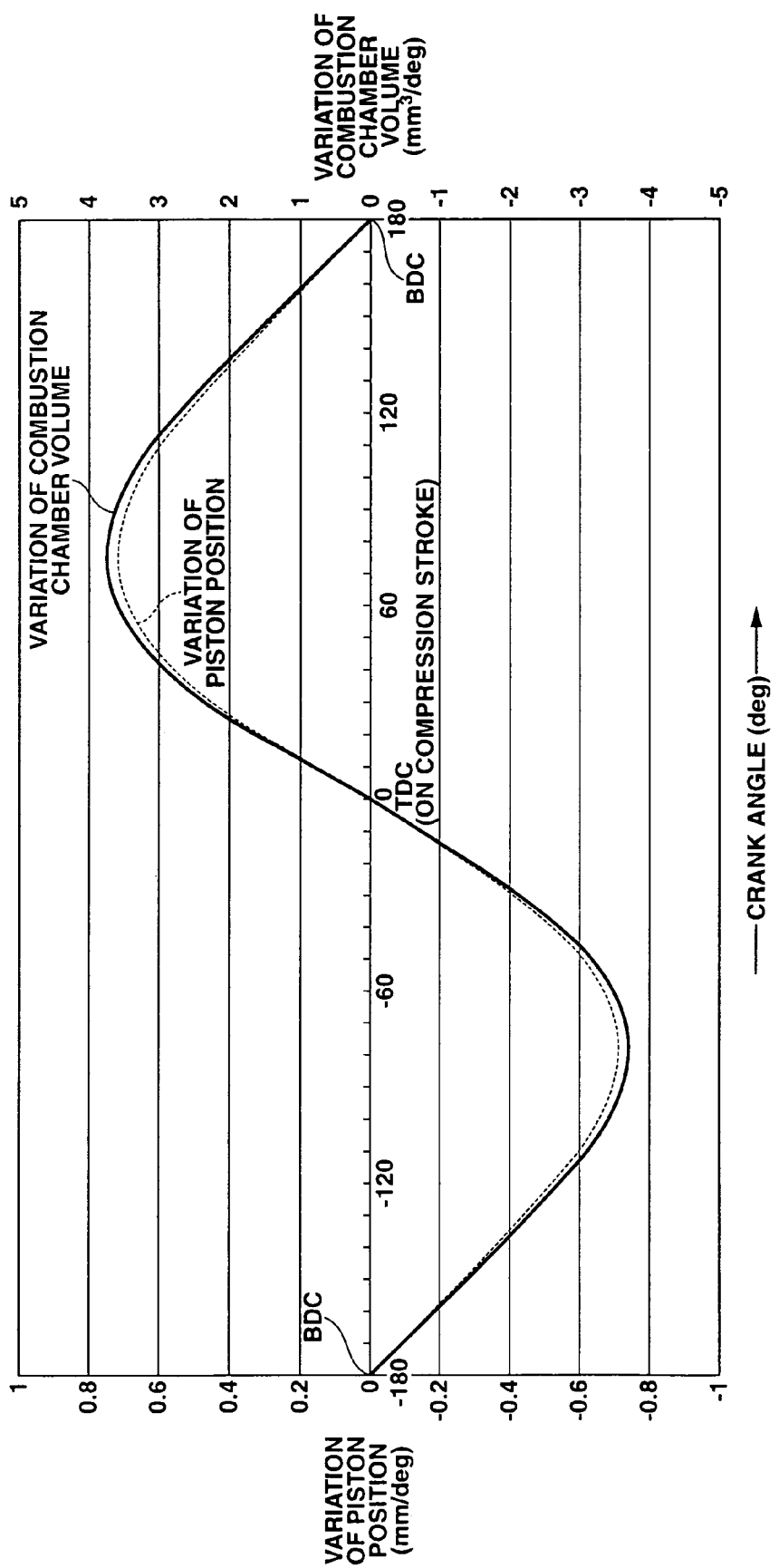
FIG. 2 is a graph depicting one operation cycle of a piston in terms of a variation of the piston position and that of the volume of a corresponding combustion chamber with respect to a crank angle.

FIG. 2 is a graph depicting one operation cycle of the engine in terms of a change of position of piston 3 and that of a volume of a corresponding combustion chamber 5 with respect to the crank angle.

As is seen from this graph, the variation of the piston position and that of the volume of combustion chamber per unit of crank angle show the maximum values at an angular position near a half of the stroke of piston 3 and show the minimum values at an angular position near the bottom dead center (BDC) and at an angular position near the top dead center (TDC).

It is to be noted that near the top dead center (TDC) where the TDC injection operation is carried out in accordance with the invention, the piston position and the volume of the combustion chamber show only small variations. In other words, near the top dead center (TDC), there can be produced a stable field that is hardly affected by the movement of piston 3.

In the intake stroke of piston 3, some larger gas flows, such as swirl flow, tumble flow and the like, are produced, and such gas flows survive till an initial stage of the compression stroke. As is known in the art, such larger gas flows are destroyed or disappear rapidly when piston 3 comes near and to the top dead center (TDC) minimizing the volume of combustion chamber 5.

Figure 3:
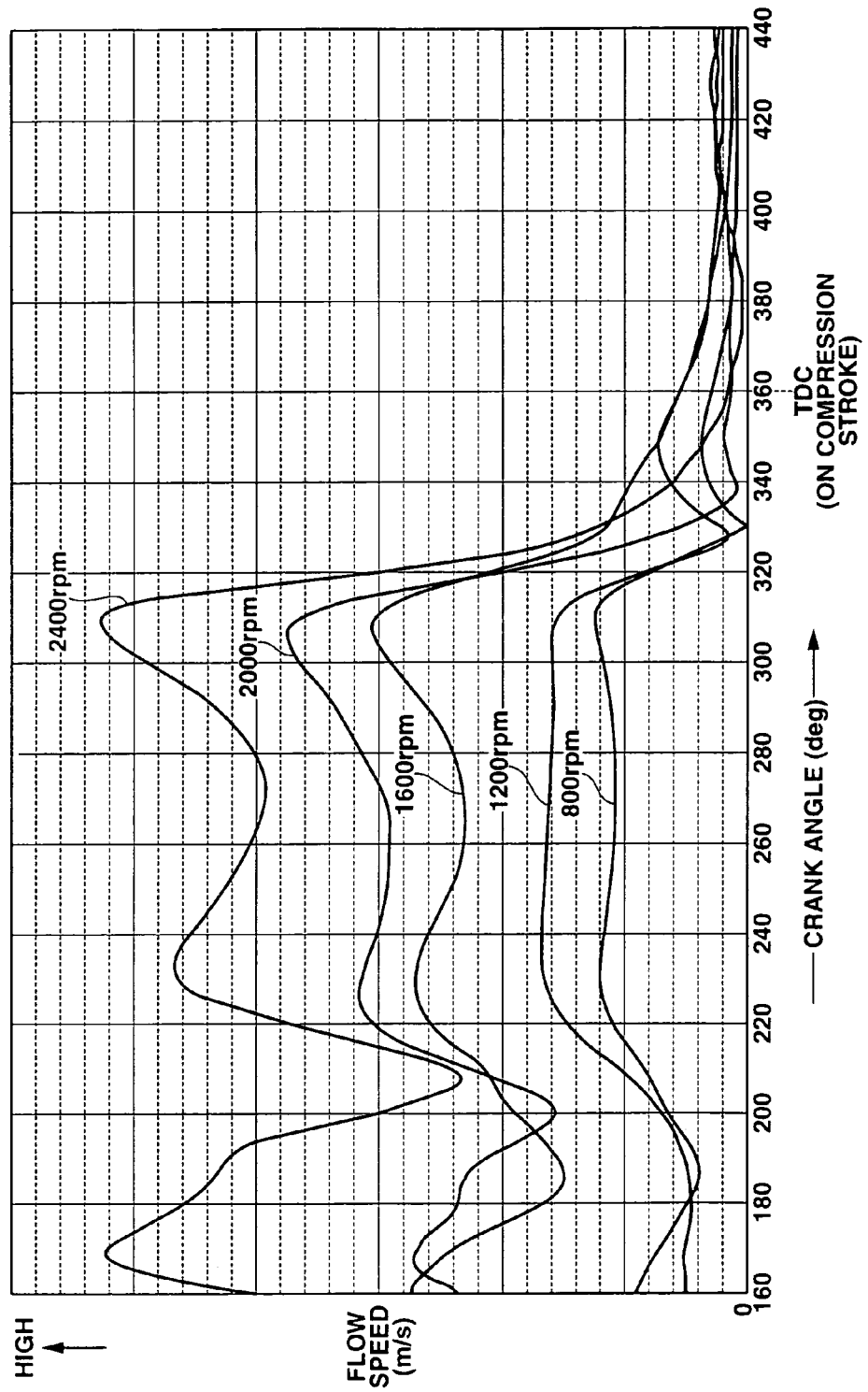
FIG. 3 is a graph depicting a variation of the flow speed of a larger gas flow in the combustion chamber in various engine speeds.

FIG. 3 is a graph depicting a variation of the flow speed of the larger gas flow in the combustion chamber in various engine speeds. As is understood from this graph, in the intake stroke, various swirl flows and/or tumble flows are produced. However, such flows are destroyed or disappear rapidly before piston 3 comes to the top dead center (TDC, viz., 360° in crank angle) on the compression stroke. This means that in accordance with the present invention, the fuel spray from nozzle 15a of fuel injection valve 15 is not substantially affected by such major gas flows, and thus, the injected fuel spray can produce a desired air-fuel mixture mass around electrodes 10a of spark plug 10.

While, destruction of the larger gas flows brings about formation of smaller gas flows that rapidly appears when piston 3 comes near the top dead center (TDC) on the compression stroke.

Figure 4:
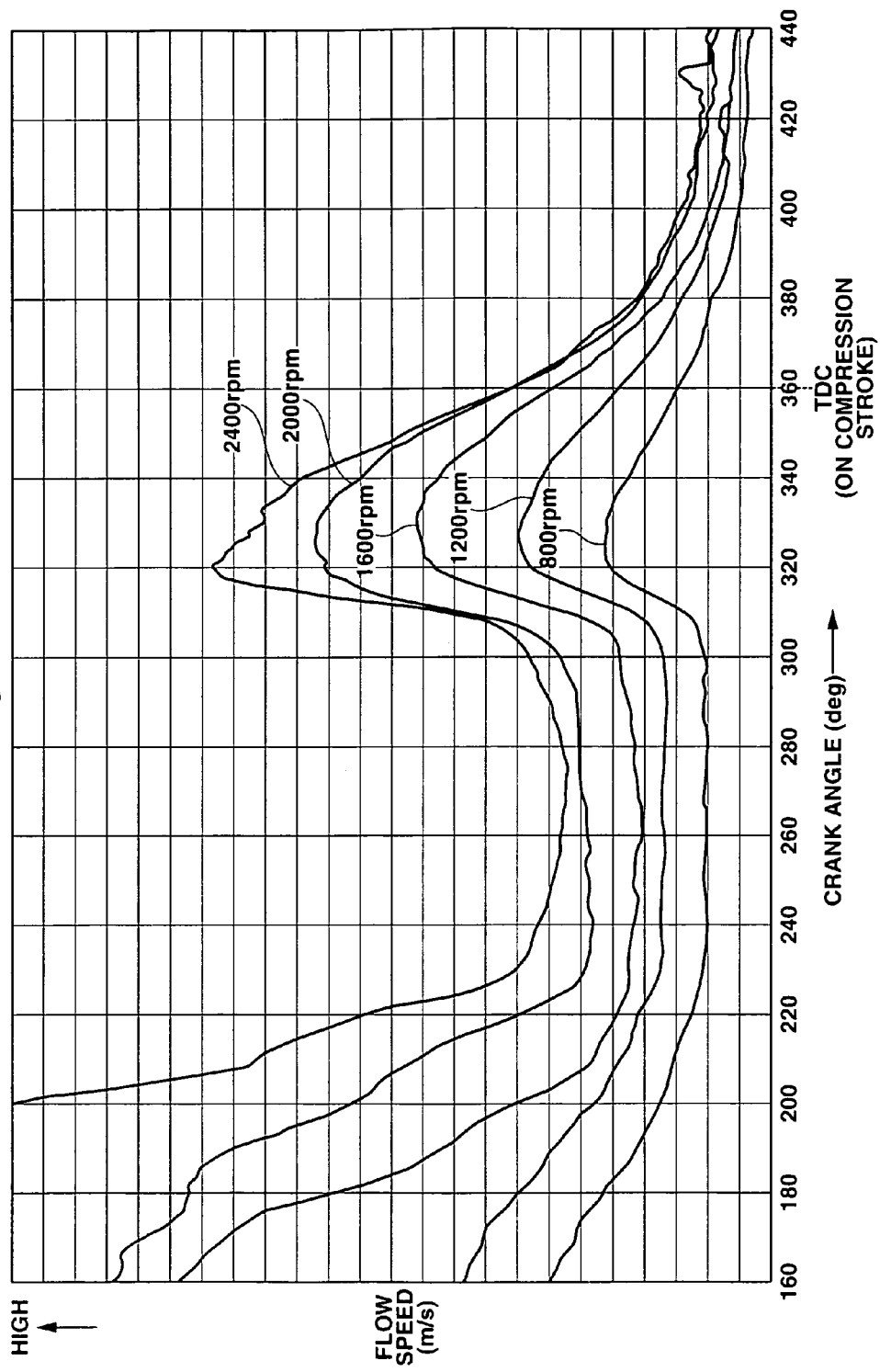
FIG. 4 is a graph depicting a variation of the flow speed of a smaller gas flow in the combustion chamber in various engine speeds.

FIG. 4 is a graph depicting a variation of the flow speed of the smaller gas flow in the combustion chamber in various engine speeds. As is understood from this graph, just before the top dead center (TDC), the flow speed of the smaller gas flow rapidly increases. As is known in the art, the rapid increase of the flow speed of the smaller gas flow contributes to activation of the field of combustion chamber 5 below electrodes 10a of spark plug 10.

As has been mentioned hereinabove, during the fuel injection, the positional relation between nozzle 15a of fuel injection valve 15, bottom surface 16a of recess 16 of piston and electrodes 10a of spark plug 10 is substantially unchanged. Thus, the fuel spray reflecting manner is kept substantially unchanged in the fuel injection period, which is advantageous in forming a desirable air-fuel mixture mass around electrodes 10a of spark plug 10.

In the following, modifications of the present invention will be described.

If desired, bottom surface 16a of rectangular recess 16 of piston 3 may have a parabolically concave surface that has, when piston 3 comes to the top dead center (TDC), one focus at nozzle 15a of fuel injection valve 15 and the other focus at electrodes 10a of spark plug 10. In this modification, any injected fuel spray that runs off the imaginary center axis "F" can be reflected toward electrodes 10a by the parabolically concave bottom surface 16a.

Figure 10:
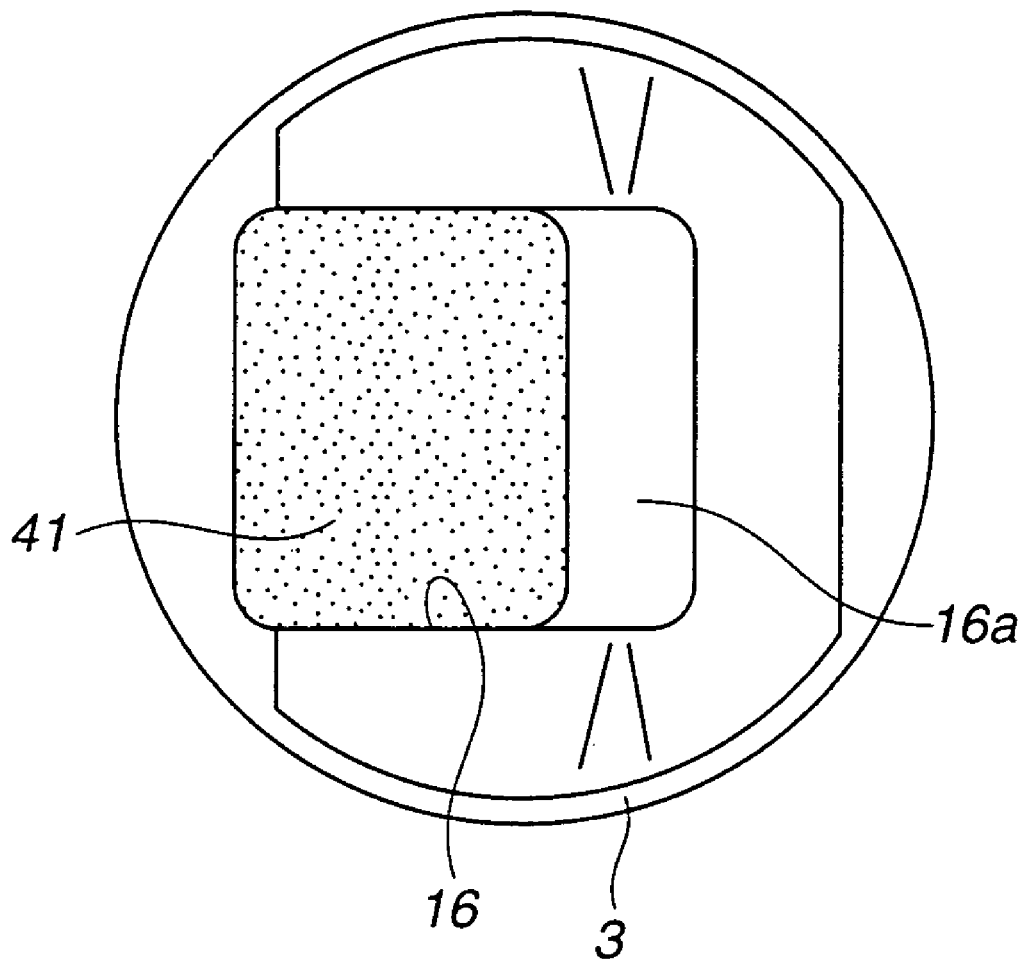
FIG. 10 is a plan view of the piston showing a bottom surface of a recess formed in the crown portion of the piston, that is coated with an oil repellent film.

If desired, as is seen from FIG. 10, the bottom surface 16a of recess 16 may be partially or entirely coated with an oil repellent film 41, such as polytetrafluoroethylene (PTFE) or the like. With this measure, undesired fuel adhesion on bottom surface 16a can be minimized.

Figure 11:
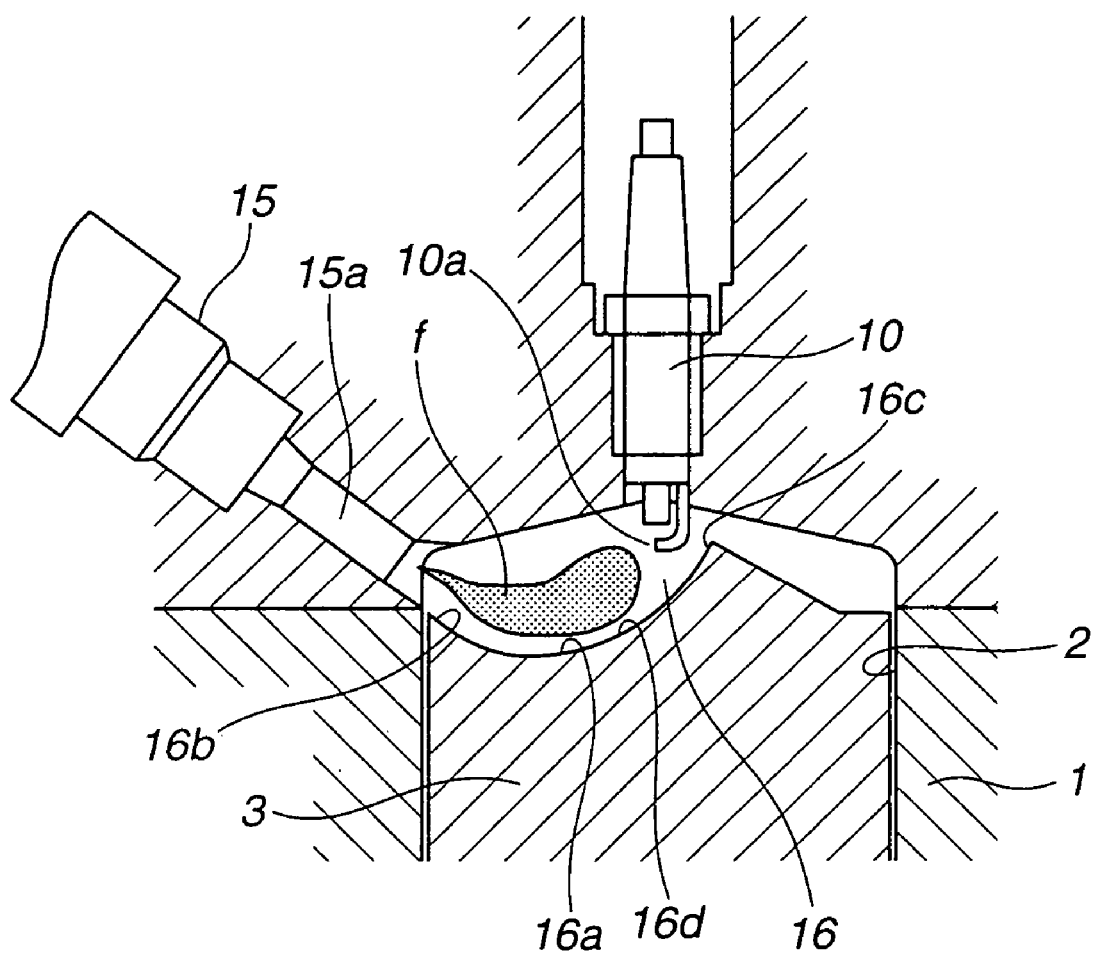
FIG. 11 is a view similar to FIG. 8, but showing a modification of the present invention.

If desired, bottom surface 16a of recess 16 may have such a shape as shown in FIG. 11.

That is, in this modification, bottom surface 16a is so shaped that, when piston 3 takes the top dead center (TDC), the fuel injected from nozzle 15a of fuel injection valve 15 slides smoothly along bottom surface 16a to reach electrodes 10a of spark plug 10. For achieving such smooth traveling of the injected fuel, bottom surface 16a comprises a leading (or left) end portion 16b, a trailing (or right) end portion 16c and a convexly rounded major portion 16d that extends between the leading and trailing ends portions 16b and 16c. More specifically, bottom surface 16a is so constructed and shaped that, when piston 3 takes the top dead center (TDC), leading end portion 16b extends in parallel with the above-mentioned imaginary center axis "F" and at the same time trailing end portion 16c is positioned close to electrodes 10a of spark plug 10. Also in this modification, a desired air-fuel mixture mass can be produced around electrodes 10a of spark plug 10 due to the unique shape of bottom surface 16a of recess 16 of piston 3.

The entire contents of Japanese Patent Applications 2004-216747 filed Jul. 26, 2004 and 2004-226236 filed Aug. 3, 2004 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A direct fuel injection spark ignition internal combustion engine comprising:
   a cylinder;
   at least one intake port leading to the cylinder;
   at least one exhaust port extending from the cylinder;
   a piston axially movably received in the cylinder to define in the same a combustion chamber that is connectable with the intake and exhaust ports through intake and exhaust valves respectively;
   a fuel injection valve having a fuel injection nozzle exposed to the combustion chamber;
   a spark plug having electrodes exposed to the combustion chamber;
   an arrangement wherein when, with the piston assuming the top dead center on the compression stroke, a fuel is injected from the nozzle of the fuel injection valve, the injected fuel from the nozzle is guided to reach the electrodes of spark plug by a crown portion of the piston; and
   a control unit that controls the fuel injection valve and the spark plug, the control unit being configured to carry out under a given condition:
   controlling the fuel injection valve to start the fuel injection at a time before the top dead center (TDC) on the compression stroke, continue the fuel injection through the top dead center (TDC), and finish the fuel injection at a time after the top dead center (TDC) on the compression stroke; and
   controlling the spark plug to carry out the ignition at a time after the top dead center (TDC).

2. A direct fuel injection spark ignition internal combustion engine as claimed in claim 1, in which the fuel injection valve is arranged at one side portion of the combustion chamber to inject the fuel from the nozzle in an obliquely downward direction in the combustion chamber, and the spark plug is arranged at a generally center position of a ceiling of the combustion chamber, wherein when, with the piston assuming the top dead center (TDC) on the compression stroke, a fuel is injected from fuel injection nozzle, the injected fuel is directed to the crown portion of the piston and reflected by the same and then directed toward the electrodes of the spark plug.

3. A direct fuel injection spark ignition internal combustion engine as claimed in claim 2, in which the crown portion of the piston is formed with a recess that has a concave bottom surface against which the injected fuel from the fuel injection valve impinges to be reflected toward the electrodes of the spark plug.

4. A direct fuel injection spark ignition internal combustion engine as claimed in claim 2, in which the crown portion of the piston is formed with a recess that has a elliptically concave bottom surface that has, when the piston takes the top dead center (TDC) on the compression stroke, one focus at the nozzle of the fuel injection valve and the other focus at the electrodes of the spark plug.

5. A direct fuel injection spark ignition internal combustion engine as claimed in claim 1, in which the fuel injection valve is arranged at one side portion of the combustion chamber to inject the fuel from the nozzle in an obliquely downward direction in the combustion chamber, in which the spark plug is arranged at a generally center position of a ceiling of the combustion chamber and in which the crown portion of the piston is formed with a convexly rounded surface that is so shaped that when the piston takes the top dead center (TDC) on the compression stroke, the injected fuel from the fuel injection valve is permitted to run on the convexly rounded surface before reaching the electrodes of the spark plug.

6. A direct fuel injection spark ignition internal combustion engine as claimed in claim 1, in which the fuel injection valve is arranged at one side portion of the combustion chamber to inject the fuel from the nozzle in an obliquely downward direction in the combustion chamber, in which the spark plug is arranged at a generally center position of a ceiling of the combustion chamber and in which the crown portion of the piston is formed with a convexly rounded surface that is so shaped that when the piston takes the top dead center (TDC) on the compression stroke, the injected fuel from the fuel injection valve is permitted to impinge against the convexly rounded surface to be reflected toward the electrodes of the spark plug.

7. A direct fuel injection spark ignition internal combustion engine as claimed in claim 6, in which the convexly rounded surface constitutes a bottom surface of a recess formed in the crown portion of the piston.

8. A direct fuel injection spark ignition internal combustion engine as claimed in claim 7, in which the control unit is configured to increase the pressure of the fuel to be injected, during the fuel injection period.

9. A direct fuel injection spark ignition internal combustion engine as claimed in claim 6, in which the convexly rounded surface is coated with an oil repellent film.

10. A direct fuel injection spark ignition internal combustion engine as claimed in claim 6, in which a center line "F" defines an inclination against the convexly rounded surface by an angle "θ" that ranges from approximately 10° to approximately 50°, the center line being an imaginary center line that is defined by a conically expanding fuel spray that is kept injected from the nozzle of the fuel injection valve during the fuel injection period.

11. A direct fuel injection spark ignition internal combustion engine as claimed in claim 1, in which the given condition is a condition wherein increase of exhaust temperature is needed.

12. A direct fuel injection spark ignition internal combustion engine as claimed in claim 1, in which a period from the injection start time to the top dead center (TDC) on the compression stroke and a period from the top dead center (TDC) on the compression stroke to the fuel injection finish time are substantially equal.

13. A direct fuel injection spark ignition internal combustion engine, comprising:
   an arrangement wherein when, with a piston assuming the top dead center (TDC) on the compression stroke, a fuel is injected from a nozzle of a fuel injection valve, the injected fuel from the nozzle is guided to reach electrodes of a spark plug by a concave surface defined by a crown portion of a piston; and
   a control unit that controls the fuel injection valve and the spark plug, the control unit being configured to carry out under a given condition:
   controlling the fuel injection valve to start the fuel injection at a time before the top dead center (TDC) on the compression stroke, continue the fuel injection through the top dead center (TDC), and finish the fuel injection at a time after the top dead center (TDC) on the compression stroke; and
   controlling the spark plug to carry out the ignition at a time after the top dead center (TDC).

14. In a direct fuel injection spark ignition internal combustion engine comprising a cylinder; at least one intake port leading to the cylinder; at least one exhaust port extending from the cylinder; a piston axially movably received in the cylinder to define in the same a combustion chamber that is connectable with the intake and exhaust ports through intake and exhaust valves respectively; a fuel injection valve having a fuel injection nozzle exposed to the combustion chamber; a spark plug having electrodes exposed to the combustion chamber; and an arrangement wherein when, with the piston assuming the top dead center (TDC) on the compression stroke, a fuel is injected from the nozzle of the fuel injection valve, the injected fuel from the nozzle is guided to reach the electrodes of spark plug by a crown portion of the piston,
   a method for controlling operation of the engine, comprising:
   controlling the fuel injection valve to start the fuel injection at a time before the top dead center (TDC) on the compression stroke, continue the fuel injection through the top dead center (TDC), and finish the fuel injection at a time after the top dead center (TDC) on the compression stroke; and
   controlling the spark plug to carry out the ignition at a time after the top dead center (TDC).

* * * * *

UNITED STATES PATENT AND TRADEMARK OFFICE
CERTIFICATE OF CORRECTION

PATENT NO. : 7,134,421 B2 Page 1 of 1
APPLICATION NO. : 11/189128
DATED : November 14, 2006
INVENTOR(S) : Toshiya Kono et al.

It is certified that error appears in the above-identified patent and that said Letters Patent is hereby corrected as shown below:

Title page,

Item (73) Assignee: should read --NISSAN MOTOR CO., LTD., Yokohama (JP)--

Signed and Sealed this

Twenty-third Day of January, 2007

JON W. DUDAS
*Director of the United States Patent and Trademark Office*